United States Patent
Guyomarc'h

(10) Patent No.: US 7,644,752 B2
(45) Date of Patent: Jan. 12, 2010

(54) REGULATING HEAT EXCHANGE AND COOLING METHOD AND SYSTEM FOR MONITORING AND CONTROLLING THE TEMPERATURES OF WALLS SUBJECTED TO HIGH TEMPERATURES

(75) Inventor: Raymond Guyomarc'h, Saint Theodorit (FR)

(73) Assignee: Bio 3D Applications, Paris (FR)

( * ) Notice: Subject to any disclaimer, the term of this patent is extended or adjusted under 35 U.S.C. 154(b) by 667 days.

(21) Appl. No.: 10/528,024

(22) PCT Filed: Sep. 16, 2003

(86) PCT No.: PCT/FR03/02734

§ 371 (c)(1),
(2), (4) Date: Mar. 16, 2005

(87) PCT Pub. No.: WO2004/025201

PCT Pub. Date: Mar. 25, 2004

(65) Prior Publication Data

US 2006/0151148 A1     Jul. 13, 2006

(30) Foreign Application Priority Data

Sep. 16, 2002   (FR)   .................................. 02 11458

(51) Int. Cl.
*F28D 15/00* (2006.01)
(52) U.S. Cl. ............................ 165/104.27; 165/104.32; 62/304; 373/74
(58) Field of Classification Search .................. 62/304; 373/74; 165/104.27, 104.32
See application file for complete search history.

(56) References Cited

U.S. PATENT DOCUMENTS

| | | | | |
|---|---|---|---|---|
| 4,813,055 A | * | 3/1989 | Heggart et al. | 373/74 |
| 5,115,184 A | * | 5/1992 | Arthur et al. | 373/74 |
| 5,561,685 A | * | 10/1996 | Lehr et al. | 373/76 |
| 5,797,274 A | * | 8/1998 | Jackaman et al. | 62/171 |
| 6,053,418 A | * | 4/2000 | Guyer | 237/12.1 |

FOREIGN PATENT DOCUMENTS

| | | |
|---|---|---|
| DE | 3027465 | 3/1982 |
| EP | 0044512 | 1/1982 |
| JP | 54 107807 | 8/1979 |
| WO | WO 92 14108 | 8/1992 |

\* cited by examiner

*Primary Examiner*—Frantz F Jules
*Assistant Examiner*—Azim Rahim
(74) *Attorney, Agent, or Firm*—Young & Thompson

(57) ABSTRACT

A regulating heat exchange and cooling method and system for monitoring and controlling the temperatures of walls subjected to high temperatures. The system is used to cool the inner wall of a thermal system having a double wall, the inner wall being subjected to temperatures equal to or greater than the physical capacity thereof. The system includes a network of tubes which is independent of the thermal system to be cooled. The tubes contain pressurized cooling water which circulates therethrough. The tubes have nozzles which spray and project water in the form of solid cones against the inner wall, the nozzles being controlled by adjustable-flow valves. The network of tubes forms an integral part of the outer wall of the thermal system to be cooled and the system also includes elements for maintaining the water projection area defined by the inner and outer walls in a vacuum condition.

17 Claims, 4 Drawing Sheets ized and pH-controlled, with continuous recycling.

REGULATING HEAT EXCHANGE AND COOLING METHOD AND SYSTEM FOR MONITORING AND CONTROLLING THE TEMPERATURES OF WALLS SUBJECTED TO HIGH TEMPERATURES

The present invention relates to a regulating heat exchange and cooling system, for monitoring and controlling the temperatures of walls subjected to high (and very high) temperatures, in incinerators, furnaces and all thermal generators/systems.

It also relates to a method of cooling employed in said system.

Difficulties are often encountered in maintaining the walls of thermal systems at the limit temperatures of the resistance of the materials employed. These temperatures are useful for obtaining the best results for the methods employed in these systems:

elimination of cold walls, which cause uncontrollable effects in the methods employed in the thermal systems,
   elimination of the risks of condensation on the cold walls,
   minimization of the expansions due to massive thermal shocks,
   possibility of permanent monitoring of the method at every point of the system, without disturbances due to thermal shocks and to effects connected with cold walls,
   restriction of thermal exchanges between the process zone and the cooling regulating system.

The difficulties that are encountered are connected with the capacities of the systems and methods of cooling of the walls subjected to hot sources:

heat-transfer fluids that cannot withstand elevated temperatures, hence the need to lower the temperature of the walls to that withstood by the fluid,
   complex heat-transfer fluids that withstand elevated temperatures—the composition of these fluids gives rise to problems of pollution and/or aggressiveness of the materials employed.

In any case, the temperatures tolerated by these fluids do not reach those required by the result expected by the thermal process.

The method described here is a water-based system of monitored and controlled cooling for walls, tubes, grates and accessories of generators or equipment subjected to elevated temperatures.

A system for cooling the wall of a double-wall metallurgical furnace, comprising a network of pipes passing through an outer wall and provided at their ends with spraying nozzles arranged opposite an inner wall of the furnace, is already known from document DE 3027465.

The aim is to control the temperature of the wall(s) in contact with the heat source, at the upper limits, to optimize the thermal result of the system and the efficiency of the initial process, employed in the system.

This aim is achieved with a system for cooling an inner wall of a thermal system comprising a double wall, said inner wall being subjected to temperatures greater than or equal to its physical capacity, said system comprising a network of tubes independent of the said thermal system to be cooled, said tubes containing cooling water circulating under pressure and being equipped with nozzles provided for spraying water in full cones against said inner wall and operated by cocks with controllable flow rate.

According to the invention, the network of tubes is an integral part of the outer wall of the thermal system to be cooled and in that it further comprises means for maintaining negative pressure in the water spraying zone delimited by said inner and outer walls respectively.

Advantageously, the tubes are traversed by the controllable-flow cocks, said cocks having the said nozzles at their ends.

In one embodiment of the invention, tubes are installed on the inside surface of the outer wall. Tubes can also be installed on the outside surface of the outer wall.

The cooling water circulating in the network of tubes is preferably stabilized with respect to mineral content and pH. The network of tubes is for example in closed circuit and the cooling water can be regenerated continuously and can be at a temperature less than or equal to 60° C.

In an advantageous embodiment of the invention, the zone in which the water is sprayed is maintained at negative pressure by a system that extracts the steam produced. This steam extracting system is provided for compressing said steam in order to inject it into a dedicated exchanger unit so that said steam produced and then compressed acquires its temperature and pressure suitable for power co-generation.

The cooling system according to the invention can also comprise a detecting system composed of contact sensors which permit continuous monitoring of the temperature of the walls to be regulated. Said system can also include cocks for micrometric adjustment, which can be operated automatically under computer control.

According to another aspect of the invention, a method is proposed for cooling an inner wall of a thermal system comprising a double wall, said inner wall being subjected to temperatures greater than or equal to its physical capacity, in which cooling water circulating under pressure is contained in a network of tubes independent of said thermal system to be cooled, said tubes containing and being equipped with nozzles provided for spraying the water in full cones against said inner wall and operated by controllable-flow cocks, characterized in that it comprises maintaining negative pressure in the water spraying zone delimited by said inner and outer walls respectively, the network of tubes being an integral part of the outer wall of the thermal system to be cooled.

Maintaining the material of which the wall in contact with the heat source is composed at its optimum temperature ensures it has a long life. Reduction of heat exchange, to the minimum suitable for the materials, makes it easier to obtain and control the process temperatures, and lowers the power consumption.

The method employed in this water-based system uses water that is stabilized with respect to mineral content and pH, with continuous recycling.

The principle of the method is replacement of the conventionally used mass of heat-transfer fluid with a high-pressure water spraying system.

The invention, and notably the fact that the method of cooling employed is compatible with and can be integrated with all types of equipment for thermal production or using high temperatures in their processes, will be better understood by examining the appended drawings.

Figure 1:
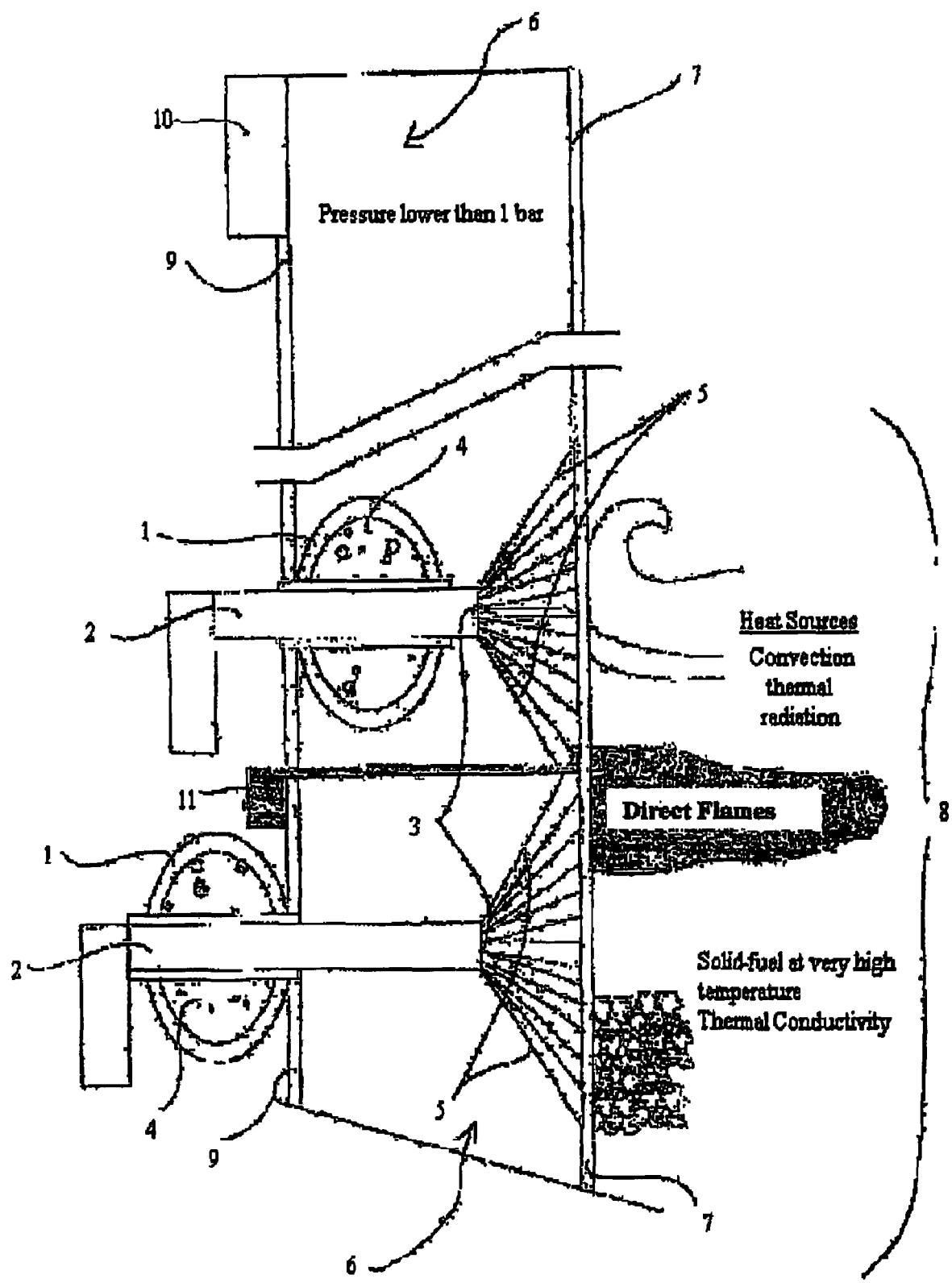
FIG. 1 shows a first embodiment of a cooling system according to the invention.

The descriptions that follow and the aforementioned figures demonstrate the ability of a cooling system according to the invention to respond to all cases of configuration and geometry of the equipment to be monitored and controlled. These descriptions and figures are just one limited example of the cases in which the method/system can be employed advantageously.

The cooling system according to the invention is installed in the inner space 6 of the double wall reserved for cooling the zones in contact with the heat sources.

The system comprises a network of tubes 1 which convey the water under pressure 4. The pressure is relative to the flows used for regulating and monitoring the various zones to be controlled.

Installation of said network of tubes on the outer leaf 9 (cold) of the double wall contributes to the rigidity of the structure, making it possible to reduce the thickness of said leaf.

This network of tubes can be installed either on the inside surface or on the outside surface of wall 9, depending on the general configuration of the equipment in question.

Cocks 2 pass through said tubes 1 from place to place depending on the thermal zone to be monitored. Nozzles 3 or injectors, directed towards the wall to be cooled 7, are installed at the end of these cocks. Operation of these cocks is electrical and progressive, with micrometric adjustment and computer-controlled automatic operation. These cocks can be dismantled while the tube is under load, for maintenance without production stoppages.

The water is atomized as it passes through the nozzles. It is sprayed in full conical jets 5 into the volume included in the interior space 6 on the outside surface of the leaves 7 that are subjected to heat release 8 that is to be controlled.

This system provides monitoring, control and modulation of the temperatures of walls subjected to a thermal flux or to a high thermal conductivity—especially if the intensity of this thermal emanation 8 is greater than the physicochemical resistance of the materials employed.

Each thermal zone is equipped with a detecting system, composed of contact sensors 11 which permit continuous monitoring of the temperature of the wall to be regulated 7.

The system acts on the operation of cocks 2 and regulates the flow rate of atomized water 3 and makes it possible to control the temperature of the wall by varying said flow rate.

The volume enclosed in the double wall 6 is at negative pressure because of a steam extractor/compressor 10. This consequently permits instantaneous evaporation, at low temperature, of the atomized water as soon as it makes contact with the wall 7 to be controlled and to limit the thermal shocks.

The quantity of latent heat absorbed by the system permits better control of the temperature required by useful heat exchange with the wall, using only the necessary quantity of liquid.

Consider, for example, a solid-fuel combustion chamber 8 with $O_2$ supporting combustion, reaching temperatures above the melting point of steels and the resistance of refractories. This case is typical of the difficulties in maintaining wall temperatures at their maximum possible, for better efficiency in the process being employed. It is also typical of the difficulties in maintaining the temperature of the walls in contact 7 with the thermal mass 8 at optimum temperatures for the resistance of the materials of which said walls are composed.

Figure 4:
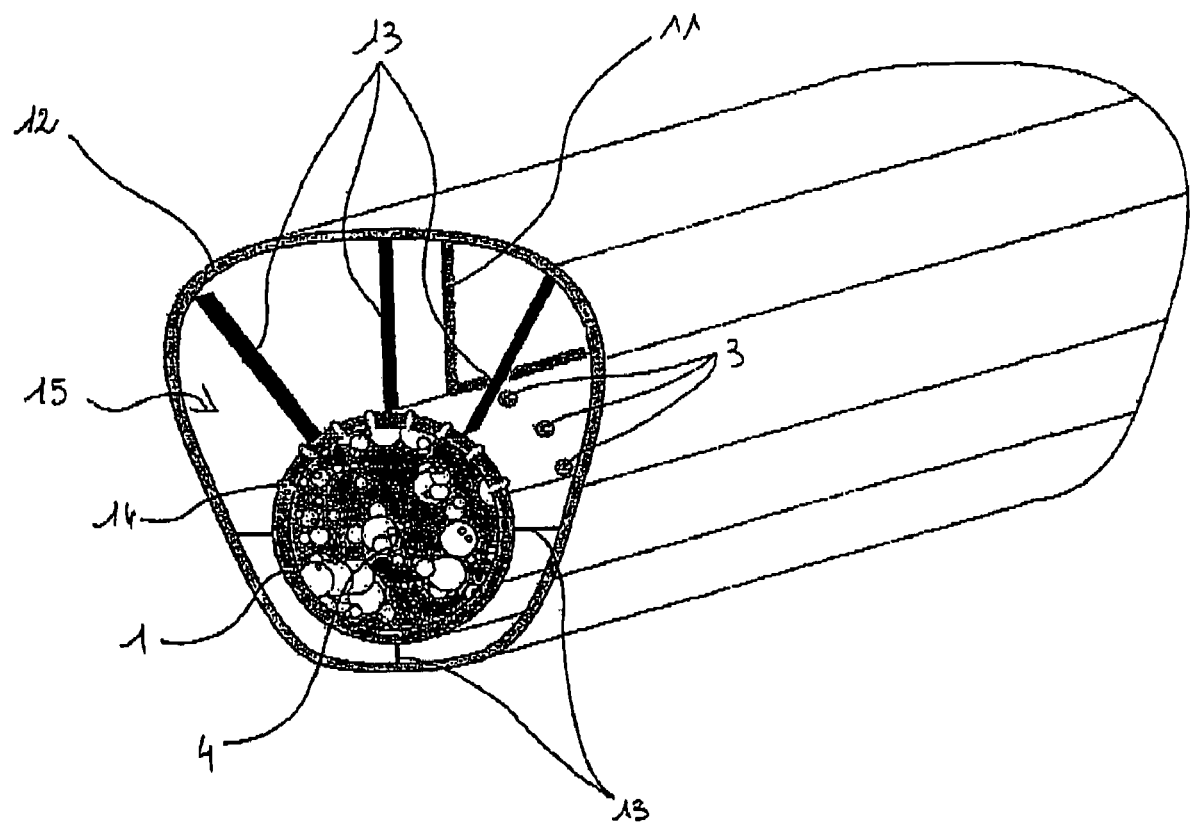
FIG. 4 shows a cross-section of a tube employed in the cooling system according to the invention.

As an example, FIG. 4 shows a cross-section of tube 12 that can be a component of a grate or a cross-member that is subjected to elevated temperatures. Tube 1 under pressure, located in tube 12, is held in place by cross-members 13. Tube 1 has holes 14 and for each hole there is a corresponding nozzle 3 for spraying the water that it conveys.

The water is sprayed in the heat exchange zone 15 of tube 12. Said tube 1 is operated by a cock 2 installed at one end and can be blind or connected at both ends to permit circulation of the water. One of the advantages of this configuration is that tube 12 is subjected to an elevated temperature of constant value which tends to deform it; whereas tube 1 is at low temperature and does not undergo this deformation.

This low temperature has no effect on tube 12 and does not give rise to thermal difference, shocks or distortion. It is the atomized water 5 which regulates and controls the temperature of tube 12, whereas tube 1 is not sensitive to the elevated temperature and remains rigid as configured. This state ensures the maintenance and rigidity of tube 12.

The heat source can be any currently-known source at all.

The objective is to be able to employ special steels with very long service life in conditions of maximum durability and efficiency.

This system allows a considerable reduction in thickness of the materials to be employed. The thickness of the wall in contact with the thermal flux can be reduced to a minimum mechanical strength, as the pressures on either side of these walls are in stable equilibrium. The thickness reduction optimizes the heat exchange and the efficiency of temperature control.

This makes it possible to construct plants with better heat exchange and reduced maintenance costs. The wall in contact with the thermal flux can be constructed in the form of replaceable jacketing. The structure and the bearing wall of the control system are not subject to stress and their maintenance cost is reduced owing to their prolonged life.

Atomization of the water on the wall requiring thermal control promotes its instantaneous evaporation. Spraying under high pressure ensures perfect, moderate wetting of the walls to be controlled, regardless of their location or their position in the equipment configuration.

Figure 2:
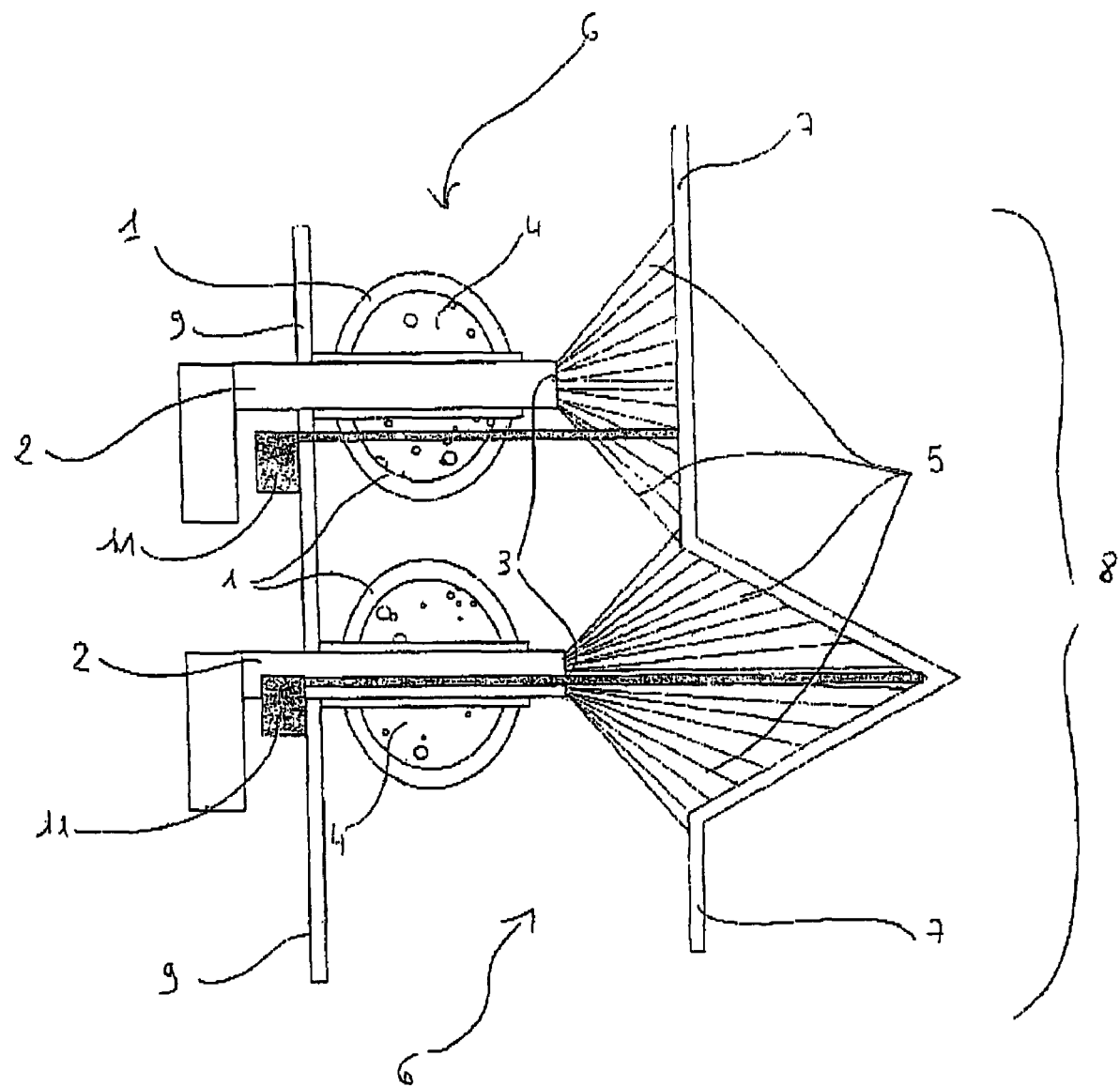
FIG. 2 shows a second embodiment of a cooling system according to the invention.
Figure 3:
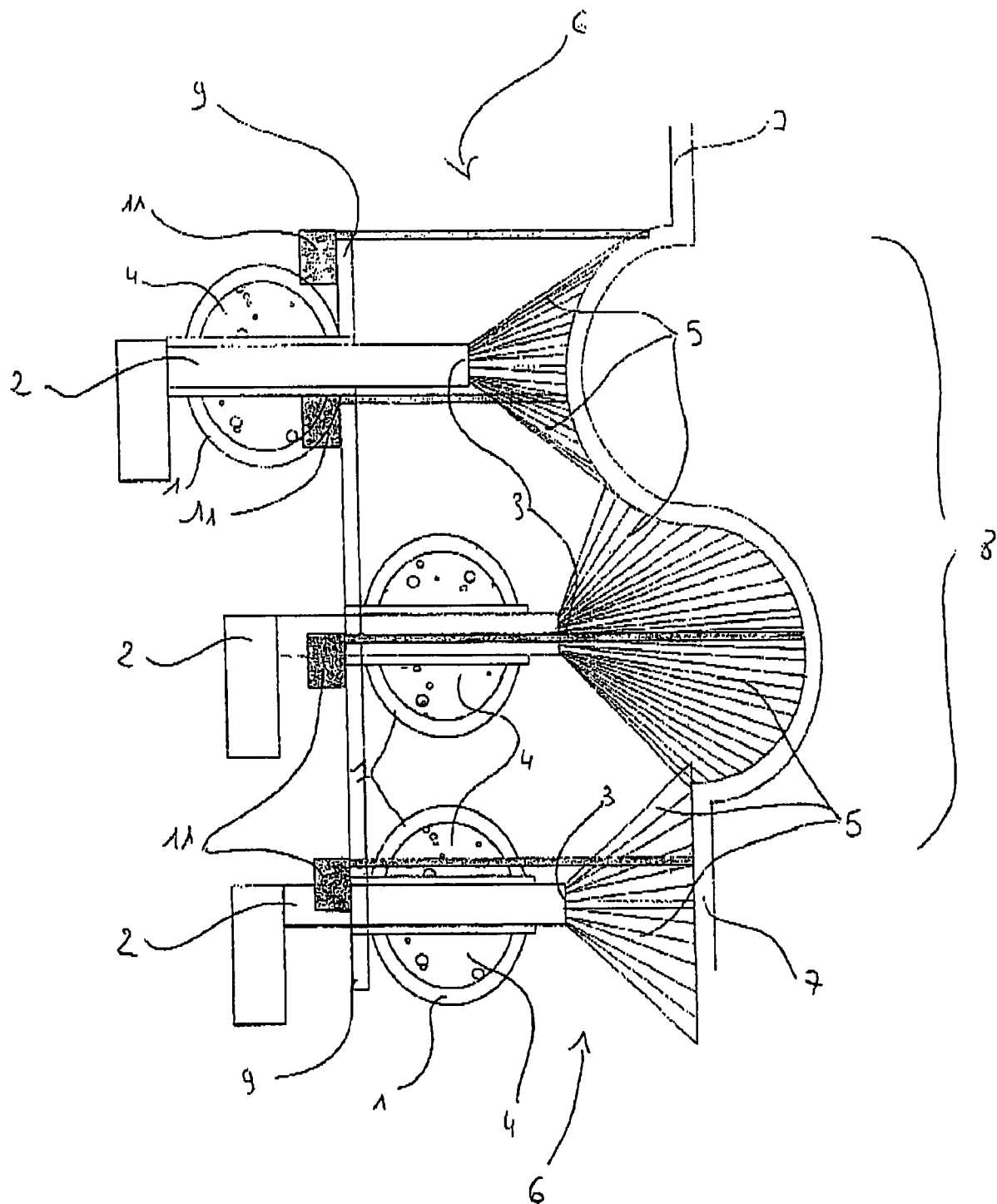
FIG. 3 shows electrically-operated cocks employed in the cooling system according to the invention.

This permits precise targeting of the action zone of each jet and control of its intensity instantly in relation to the required heat absorption. Each cock has automatic micrometric regulation under computer control. It corresponds to one or more jets depending on the zone to be controlled. Each sensitive zone can therefore be treated specifically. The pressure of the tube assembly provides accurate directional jets which can reach zones that are difficult to cool, referring to FIGS. 2 and 3.

Spraying of the atomized water under high pressure accelerates its evaporation. This instantaneous evaporation absorbs large quantities of thermal energy in a very short time. Sensors 11 distributed over all sensitive points permit most precise control of the temperatures required owing to their action on real-time regulation of the flow of water in the zone in question. This system guarantees uniformity of temperature of walls 7 of the space with heat emission 8, by reacting instantly to any fluctuations in these emissions.

This provides maximum reduction of the stresses to which the materials employed are subjected, by minimizing the thermal shocks, ensuring they have a longer service life.

The water is distributed by a network of pipes 1 fixed to the outer wall of the shell 9 of the heat exchanger. The pressure of the water in this network can be high, without affecting the durability of the walls. On the contrary, these pipes contribute to the strength of the supporting wall.

The pressure can be adjusted to the required flow rates, and metering of the flow of each injector 3 can be controlled more easily. The advantage of this pressure capacity is to admit useful flows at all points of the zones to be treated, permit atomization of the water, spray this atomized water vigorously and thus promote its micronization, which ensures fast evaporation.

The location of this distribution network on the wall of shell 9 permits quick maintenance without stopping the system. Each injection mechanism can be installed so that it is accessible from the outside. Such mechanisms exist, but if necessary, special devices can easily be constructed on the basis of existing know-how.

Instantaneous evaporation of the water occurs at low temperature and makes it possible to control the internal pressure of the heat exchanger. This pressure will be the lowest possible for an evaporation temperature less than or equal to 70° C. The steam generated will be extracted mechanically by a dedicated compressor.

The purpose of these characteristics is to keep the volume of double wall 6 under negative pressure, which promotes evacuation of the steam. The steam obtained in these conditions is dry, even though it is at very low temperature. It is compressed and then injected into a known exchanger unit where it will acquire its working temperature and pressure for co-generation.

Several booster tanks, for example numbering four or more depending on the thermal power and the quantity of steam produced, are involved in the production of superheated steam. These tanks are cleared of their superheated steam alternately, by co-generation equipment, and refilled with low-temperature steam by a compressor so that they acquire the booster charge of "sensible" heat, and so on.

The advantages of the procedure that has just been described comprise:
- maintaining low pressures in the exchange volume of double wall 6 of the thermal generator. Only the tanks are subjected to the high pressures required for co-generation. They are less expensive to manufacture than the exchanger of the generator if it were subjected to the very high pressures required for co-generation. Maintenance is easier and does not necessitate stoppage of the system. Flow management means that maintenance of the exchangers can be carried out without stopping their operation, and this maintenance can be automated;
- optimizing the heat exchange in the booster tanks, exchange being of the gas/gas type with optimized friction and fluidity. The exchange surfaces have maximum area, thermal acquisition of sensible heat is faster and boosting is accelerated;
- alternating the state of the tanks (full or empty) ensures regular, continuous and controlled supply of superheated steam to the co-generation equipment.

As another advantage of the method according to the invention, we may mention that water can be used instead of specific, complex, dangerous and very harmful heat-transfer fluids.

The invention claimed is:

1. System for cooling an inner wall (7) of a thermal system comprising a double wall (9), said inner wall being subjected to temperatures greater than or equal to the inner wall's physical capacity, said system comprising:
   - a network of tubes (1) independent of said thermal system to be cooled;
   - cooling water (4) circulating under pressure and at a maintained temperature within said tubes;
   - nozzles (3) connected to said tubes and configured for atomizing the cooling water from said tubes and spraying the cooling water in full cones (5) via said nozzles against said inner wall (7);
   - adjustable-flow cocks (2) controllable for controlling the atomizing of the cooling water during the spraying, said network of tubes being an integral part of an outer wall (9) of the thermal system to be cooled;
   - a water spraying zone located between said respective inner and outer walls and maintained at a negative pressure; and
   - another system configured for maintaining the negative pressure within the water spraying zone delimited by said respective inner and outer walls, wherein the negative pressure is maintained for an evaporation of the sprayed cooling water at a low temperature;
   - wherein the system for maintaining the negative pressure with the water spraying zone (6) comprises a steam-extraction system (10) that extracts steam produced within the water spray zone; wherein the steam-extraction system (10) is comprised of a compressor to compress said extracted steam and inject the compressed steam into a dedicated exchanger unit so that said compressed steam acquires a temperature and a pressure suitable for power co-generation.

2. System according to claim 1, wherein the adjustable-flow cocks (2) pass through the tubes (1), and said cocks terminating in said nozzles (3)

3. System according to claim 1, wherein said tubes are installed on an inside surface of the outer wall (9).

4. System according to claim 1, wherein said tubes are installed on an outside surface of the outer wall (9).

5. System according to claim 1, wherein the cooling water (4) circulating in the network of tubes (1) is stabilized with respect to mineral content and pH.

6. System according to claim 1, wherein the network of tubes is in a closed circuit and the cooling water (4) is regenerated continuously.

7. System according to claim 1, wherein the cooling water (4) contained in the network of tubes (1) is maintained at a temperature less than or equal to 60° C.

8. System according to claim 1, further comprising:
   a detecting system (11) composed of contact sensors which permit continuous monitoring of the wall temperature that is to be regulated.

9. System according to claim 1, wherein said cocks include micrometric adjustment.

10. System according to claim 1, wherein said cocks are provided with computer-controlled automatic operation.

11. Method of cooling an inner wall of a thermal system comprising a double wall, employed in a cooling system, said inner wall being subjected to temperatures greater than or equal to its physical capacity, in which cooling water circulating under pressure is contained in a network of tubes independent of said thermal system to be cooled, said tubes containing and being equipped with nozzles provided for atomizing the water and spraying it in full cones against said inner wall and controlled by adjustable-flow cocks, characterized in that it comprises maintaining a water-spraying zone delimited by said inner and outer walls under negative pressure for an evaporation of the cooling water at a low temperature, and the network of tubes being an integral part of the outer wall of the thermal system to be cooled wherein the negative pressure is maintained by a steam-extraction system (10) that extracts steam produced within the water spray zone; wherein the steam-extraction system (10) is comprised of a compressor to compress said extracted steam and inject the compressed steam into a dedicated exchanger unit so that said compressed steam acquires a temperature and a pressure suitable for power co-generation.

12. System according to claim 1, wherein,
system for maintaining the negative pressure within the water spray zone (6) comprises a steam-extraction system is (10) located in a vertically uppermost part of the water spraying zone and extracts steam from the upper part of the water spraying zone, and.

13. System according to claim 1, wherein,
the steam-extraction system (10) located in a vertically upper part of the water spraying zone and extracts steam from the upper part of the water spraying zone.

14. System according to claim 1, wherein, the system configured for maintaining the negative pressure within the water spraying zone delimited by said respective inner and outer walls, the negative pressure maintained for the evaporation of the sprayed cooling water at the low temperature is less than or equal to 70° C.

15. The method according to claim 11, wherein the low temperature is less than or equal to 70° C.

16. System for cooling an inner wall (7) of a thermal system comprising an inner wall and an outer wall, said system comprising:
a network of tubes (1) independent of said thermal system to be cooled, said network of tubes being an integral part of the outer wall;
cooling water (4) circulating under pressure within said tubes;
nozzles (3) connected to said tubes and configured for atomizing the cooling water ejected from said tubes and spraying the cooling water in full cones (5) via said nozzles against the inner wall (7);
a water spraying zone located between the inner and outer walls and maintained at a negative pressure; and
a steam-extraction system located in a vertically upper part of the water spraying zone and configured for maintaining the negative pressure within the water spraying zone by extracting steam from within the upper part of the water spraying zone and compressing the extracted steam, wherein the negative pressure is regulated for an evaporation of the sprayed cooling water at low temperature the steam extraction system (10) comprises a compressor to compress said extracted steam and inject the compressed steam into a dedicated exchanger unit so that said extracted steam acquires a temperature and a pressure suitable for power co-generation.

17. System according to claim 16, wherein, the steam-extraction system configured for maintaining the negative pressure within the water spraying zone by extracting steam from within the upper part of the water spraying zone and compressing the extracted steam, with the negative pressure regulated for the evaporation of the sprayed cooling water, the low temperature is less than or equal to 70° C.

* * * * *